2 Sheets--Sheet 1.
J. M. D. KEATING & T. V. WAYMOUTH.
Machines for Making Paper-Boxes.
No. 5,967. Reissued July 14, 1874.
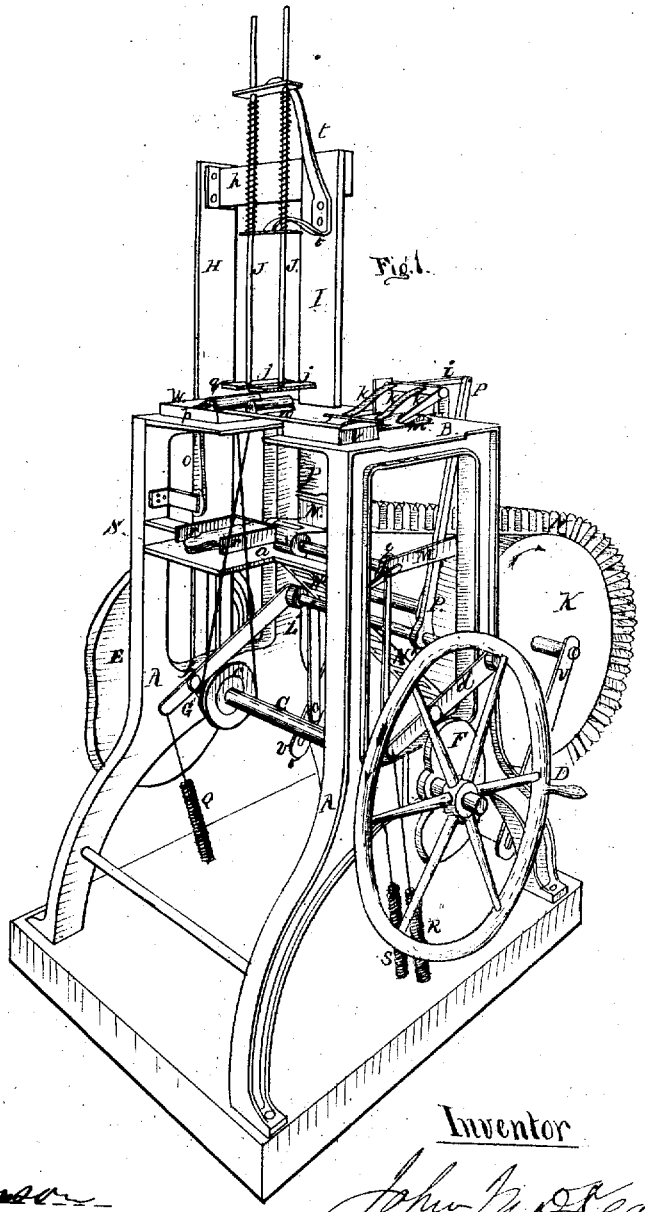
Witnesses
E. M. Johnson
J. P. Crawford
Inventor
John M. D. Keating
Thomas V. Waymouth
per C. A. Dangerfield
Atty 2 Sheets--Sheet 2.
J. M. D. KEATING & T. V. WAYMOUTH.
Machines for Making Paper-Boxes.
No. 5,967. Reissued July 14, 1874.
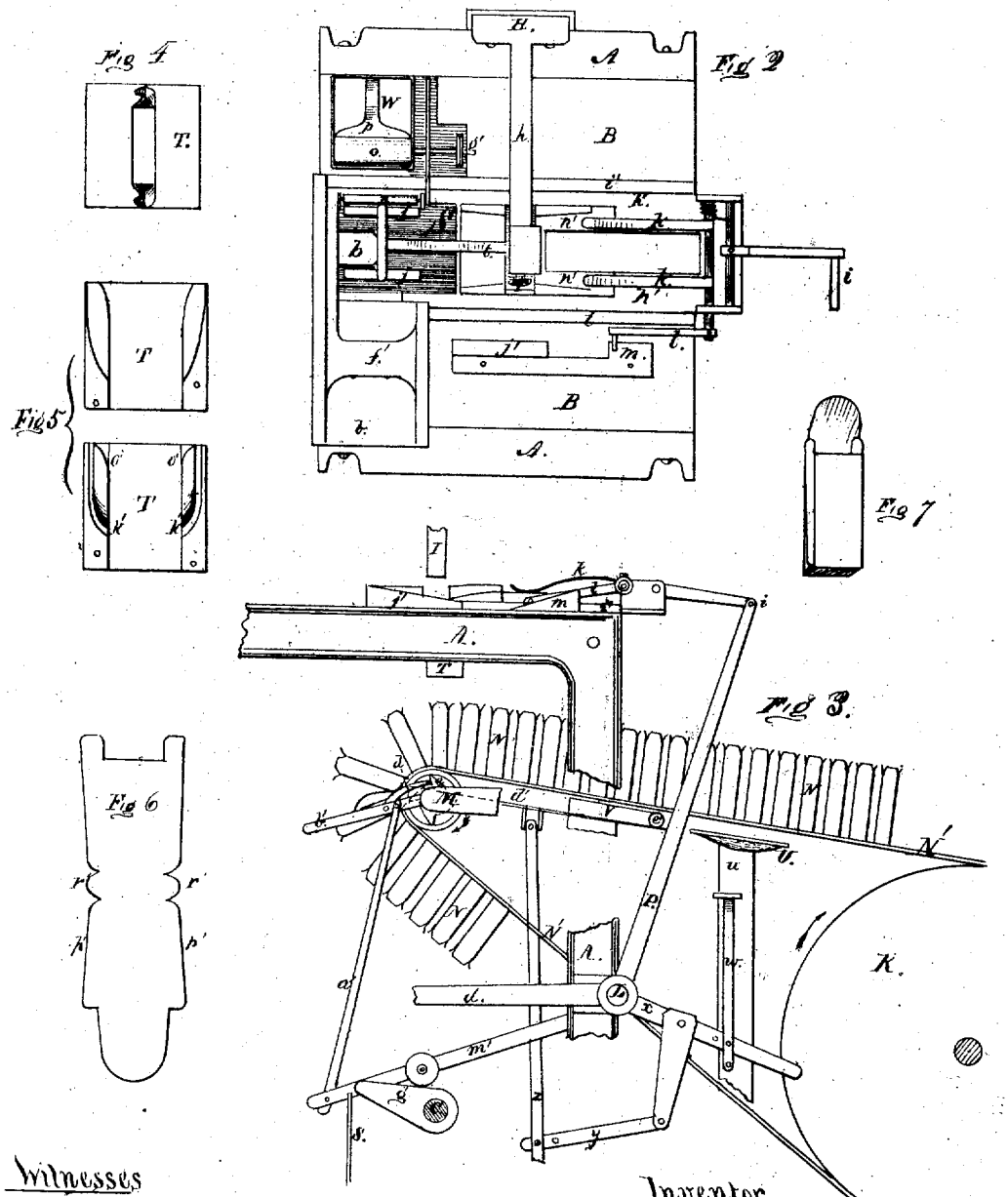
Witnesses
E. W. Johnson
J. P. Crawford
Inventor
John M. D. Keating
Thomas V. Waymouth
per C. A. Seyfarth Atty

UNITED STATES PATENT OFFICE.

JOHN M. D. KEATING AND THOMAS V. WAYMOUTH, OF NEW YORK, N. Y., ASSIGNORS, BY MESNE ASSIGNMENTS, TO CHARLES A. MAXFIELD AND JOHN P. HAUSCHILD, OF SAME PLACE.

IMPROVEMENT IN MACHINES FOR MAKING PAPER BOXES.

Specification forming part of Letters Patent No. 91,025, dated June 8, 1869; reissue No. 5,967, dated July 14, 1874; application filed July 17, 1872.

*To all whom it may concern:*

Be it known that JOHN M. D. KEATING and THOMAS V. WAYMOUTH, of the city, county, and State of New York, invented certain Improvements in Machines for Making Paper Boxes, Envelopes, &c., of which the following is a specification:

The said invention relates to machines for the manufacture of paper boxes from paper, pasteboard, or other materials that can be folded and united by adhesion; and consists in certain novel combinations, construction, and arrangement of parts, which have for their object to greatly facilitate the manufacture of such boxes, as will be fully hereinafter described.

Figure 1 is a perspective view of a machine embodying said improvements. Fig. 2 is a top view of the plate B or top part of the frame. Fig. 3 is a side elevation of a portion of the machine. Figs. 4 and 5 are views of the die which forms up the blank in connection with the former. Figs. 6 and 7 represent a paper blank and a box.

Similar letters of reference indicate like parts in all the drawings.

The primary parts of the machine consist of a strong frame, A A, and top plate B, bolted together by cross-ties, and is provided with a main shaft, C, which is the prime mover of all the parts. To the upper part of the frame A is secured a box, in which a bar, H, reciprocates, and, by means of brackets *h* and *t*, carries the former I and gummers *j j*. The lower end of this reciprocating bar H is forked and straddles the main shaft C, and it receives its motion from a roll on the stud attached thereto by the cam E. On the main shaft C is a cam, F, which, by means of a lever, *d*, secured to a rock-shaft, L, and a lever, P, reciprocates the nippers *k k*, which slide in grooves *i i'* on the top plate B of the machine. On the main shaft C is a cam, *g*, on the inside of the frame A and directly back of the cam F, which operates the lever *m'*, which has its fulcrum on the shaft L, and, by a connecting-rod, *a'*, connects with a short lever, *b'*, pivoted on the shaft M, which lever carries a ratchet-finger, which, in conjunction with a ratchet-wheel, *e*, on the shaft, rotates the shaft, and, consequently, the endless belt N', by means of a square arbor secured to the shaft, which square arbor receives a quarter-revolution at each revolution of the main shaft C. On the main shaft C is another cam, G, which, by means of a stud, operates the lever *f*, and, through the medium of a connecting-rod and elbow-lever, *d*, reciprocates a slide, *b*, which carries a gumming-roller, *n*. These cams are all of such shape as to give the required movement to the working parts, and the cam-levers are kept in contact therewith by springs, as shown. The lever P, which is secured on the shaft L, has an elbow, X, and, as it is vibrated carries a lifter, *w*, so as to bring the sand-box U in contact with the ends of the boxes as they pass along over the sand-box. Upon this lever is an arm projecting downward, and this arm connects with a rocking lever, Z, which is connected with a bracket secured to a frame by a rod. The upper end of this vibrating lever engages with the plunger *d'*, which automatically discharges the paper boxes from the receiving-boxes. This discharging-plunger slides in a proper groove or grooves on a plate secured to the frame of the machine. On the upper side of this plate is secured the reservoir or fountain V for gumming the ends of the boxes. This reservoir is provided with a roll, *e'*, which, by the friction of the endless belt, rotates intermittently, and as the ends of the paper boxes which project through the receiving-boxes are drawn over this roll a sufficient quantity of adhesive material is applied to the ends of the box for causing the sand to adhere and produce a friction-surface.

The distributing roller *o*, which supplies the gumming-roller *n*, is driven by a belt or cord passing from the pulley *c* on the main shaft to the pulley *g'* on the shaft of the distributing-roller. The drum K, over which the endless belt passes, is secured in brackets *v v*, which are bolted to the frame. The brackets are slotted longitudinally, so that the endless belt can be kept sufficiently taut.

The construction of the nippers and the operative mechanism will be readily understood from an inspection of the drawings, Figs. 2 and 3. They reciprocate a given distance for each blank, seize it from the pickers, hold and convey it to its proper position under the former, so that there can be no displacement of the blank, which is of great importance, especially when thin paper is used.

The spring-arms *k k* are secured to a shaft which has its bearings in brackets attached to the slide *h*, and the arms *k k* are held to the plate by a spring on the shaft arranged for that purpose.

The construction of the die for folding the box will be readily understood from an inspection of the drawings, Figs. 4 and 5. As the former descends upon the blank the small flaps which form the lower end of the box, Fig. 7, and the sides are simultaneously turned up, and as the plunger descends the inclined grooves in the die will fold the edges of the blank upon each other and unite them together, as shown in Fig. 7.

It will thus be seen that eight parts of the blank are formed up by the former, and six of these parts are lapped or folded upon each other and united together at a single downward stroke of the former.

The operation of the machine will be as follows: The reservoirs V W being supplied with gum and the sand-box U in the proper condition, the pile of paper blanks S, of the shape shown in Fig. 6, is laid in the box *r* on the plate *a*. The shaft C is made to revolve by proper mechanism, and while the former I is at its highest point and at rest the roll *n*, which has been brought in contact with the distributing-roller *o* in the gum-reservoir W, passes back and forth under the pieces *j j* on the rods, and coats them with the proper supply of gum. The pieces *j j* then descend upon the pile of blanks, the coil-spring upon the rods adjusting the pickers to the pile, and lift the blanks to the plate *b*. The nippers *k k* now come forward and, by means of the pin in the lever *l* traveling upon the incline *j'*, open so as to pass over the blanks, and as the pin drops over the incline the nippers clamp the blank to the inclined projections *n'*, and as the nipper-plate *k'* recedes the blank is carried forward, so that the end flaps *r'* will be directly under the former L. The former now descends, doubles the blank into the die, and in its descent passes the blank down the inclines *o' o'*, Fig. 5, in the die, which fold the inside flaps, while the outside flaps are gradually folded in the grooves *k' k'*; and as the former descends the gummed flaps are lapped to the flaps *p' p'*, Fig. 6, and by pressure in the lower part of the die are made to adhere firmly together, and the former still descending forces the folded box into the receiving-boxes. The former is withdrawn and the operation repeated. The paper box in the receiving-box is then carried forward by the receivers, and the end of the paper box which projects through the receiving-box drags over the rollers *e'*, which coats it with gum, and when directly over the sand-box the lifter *w* is raised, and the sand in the box is brought in contact with the projecting gummed end of the box, and a sufficient quantity will adhere to make a friction-surface upon which to strike the match. The box is then carried forward by the endless belt, dried, and automatically discharged by the plunger *d'*.

The receiving-boxes N are secured to the endless belt N', which is perforated to receive them, and they may be attached thereto in any proper manner. The receiving-boxes are bell-mouthed, so as to readily receive the former and the box thereon. These boxes are made small enough to produce friction upon the surface of the paper box, and thereby strip them from the former.

We are aware of the patent granted John F. Foster, March 19, 1867, No. 62,952, in which a die or equivalent device is shown to make a single lap upon a piece of paper, and we disclaim such a device.

What is claimed as the invention of JOHN M. D. KEATING and THOMAS V. WAYMOUTH is—

1. In a machine for making paper boxes, the combination of the following elements, namely: A former for shaping the boxes, a pasting or gumming apparatus arranged to take the blanks for the boxes from the top of the pile, a set of horizontally-reciprocating nippers arranged to seize, hold, and convey the blank to its position under the former, and a folding apparatus, all acting in co-operative relation with each other, substantially in the manner described and specified.

2. The combination, with the plunger I, of the double die T, constructed with grooves and inclines at both sides, as shown, so as to guide, double-lap, and unite the previously cut and gummed blank as it is forced through the machine, substantially as described and specified.

3. The combination of the following instrumentalities, namely: A former for shaping the box, a pasting or gumming apparatus for coating the blank, a set of nippers to seize, hold, and convey the blanks in position to be folded, a folding apparatus, and receivers to strip or take the boxes successively from the former, all acting in co-operative relation with each other, substantially in the manner described and specified.

4. The combination, with receiving-boxes, of a gumming and sanding apparatus for producing a friction-surface upon the ends of the boxes, substantially in the manner and for the purpose described and specified.

5. The combination of the former I, the reciprocating nippers *k k*, and pickers *j j*, the latter taking the blanks and delivering them to the nippers to be carried under the former, substantially as described.

CHS. A. MAXFIELD.
JOHN P. HAUSCHILD.

Witnesses:
E. H. JOHNSON,
C. A. DURGIN.